(12) United States Patent
Akiyama

(10) Patent No.: US 7,869,126 B2
(45) Date of Patent: Jan. 11, 2011

(54) SCREEN AND PROJECTION SYSTEM

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 12/351,296

(22) Filed: Jan. 9, 2009

(65) Prior Publication Data
US 2009/0207488 A1 Aug. 20, 2009

(30) Foreign Application Priority Data
Feb. 15, 2008 (JP) ............... 2008-034115

(51) Int. Cl.
*G03B 21/60* (2006.01)
(52) U.S. Cl. ..................... 359/454; 359/459
(58) Field of Classification Search ........... 359/449, 359/443, 459, 461, 454, 452–453
See application file for complete search history.

(56) References Cited

U.S. PATENT DOCUMENTS

| | | | | |
|---|---|---|---|---|
| 5,815,313 A | * | 9/1998 | Mitani et al. | ........ 359/448 |
| 6,844,969 B2 | * | 1/2005 | Cho et al. | ........ 359/459 |
| 7,164,536 B2 | * | 1/2007 | Whitehead | ........ 359/618 |
| 7,262,911 B2 | * | 8/2007 | Niwa et al. | ........ 359/459 |
| 7,324,276 B2 | * | 1/2008 | Wood | ........ 359/449 |

FOREIGN PATENT DOCUMENTS

| | | |
|---|---|---|
| JP | A-02-071240 | 3/1990 |
| JP | A-03-156435 | 7/1991 |
| JP | A-05-072631 | 3/1993 |
| JP | B2-3033853 | 4/2000 |
| JP | A-2004-177427 | 6/2004 |
| JP | A-2005-017894 | 1/2005 |
| JP | A-2005-134448 | 5/2005 |
| JP | A-2006-215162 | 8/2006 |

* cited by examiner

*Primary Examiner*—Christopher Mahoney
(74) *Attorney, Agent, or Firm*—Oliff & Berridge, PLC

(57) ABSTRACT

A screen includes a screen sheet including a lens array having a plurality of element lenses arranged in a two-dimensional plane on the front side of the screen, a plurality of reflection surfaces disposed on the backside of the lens array, the plurality of reflection surfaces inclined to the two-dimensional plane, and a plurality of scattering portions that scatter the light directed from the plurality of reflection surfaces toward the front side of the screen. At least one of the plurality of element lenses is a combined lens comprised of a set of two lens portions offset from each other obtained by relatively shifting optical axes of the lens portions, and the reflection surfaces correspond to the respective combined lenses.

13 Claims, 9 Drawing Sheets

SCREEN AND PROJECTION SYSTEM

BACKGROUND

1. Technical Field

The present invention relates to a screen that reflects projection light from a projector or other projection apparatus in front of the screen to display a projected image, and a projection system using such a screen.

2. Related Art

There is a screen comprised of integrated microlenses and reflection surfaces with the orientation of the reflection surfaces disposed behind the microlenses being inclined to the center normal line of the screen, in particular, a screen in which the inclination angle is gradually changed from the central portion of the screen toward the periphery thereof (see JP-A-3-156435). There is another screen in which a lenticular lens is formed on the surface of the screen and the cross-sectional shape of the lenticular lens is non-arcuate (see JP-A-5-72631).

When a reflective screen that reflects projection light from a projector or other projection apparatus in front of the screen to display a projected image is used, for example, to reflect the projection light incident at a large angle of incidence in the forward direction, each of the reflection surfaces needs to be positioned close to the lens surface of the corresponding microlenses because the reflection surface is desirably disposed in front of the focus position of the microlenses and other reasons in order to efficiently scatter and reflect the incident projection light in the forward direction at an appropriate angle of view. In this case, when the reflection surfaces are too close to the lens surfaces, a series of portions where the reflection surfaces are close to the lens surfaces are significantly thin, probably resulting in a manufacturing problem and a strength problem.

As another problem, when a reflective screen is used, part of external light, which is unwanted light, may be reflected toward a person who is looking at the screen, and the reflected external light may reduce the contrast of a projected image.

SUMMARY

An advantage of some aspects of the invention is to provide a screen that can reduce the influence of external light to improve the contrast of a projected image in a bright room or any other similar place, appropriately reflect and scatter projection light incident at a large angle of incidence in the forward direction, and have a thin structure but have a sufficient strength. Another advantage of some aspects of the invention is to provide a projection system using such a screen.

A screen according to an aspect of the invention includes (a) a screen sheet including (a1) a lens array having a plurality of element lenses arranged in a two-dimensional plane on the front side of the screen, (a2) a plurality of reflection surfaces disposed on the backside of the lens array, the plurality of reflection surfaces inclined to the two-dimensional plane, and (a3) a plurality of scattering portions that scatter the light directed from the plurality of reflection surfaces toward the front side of the screen, (b) at least one of the element lenses is a combined lens comprised of a set of two lens portions offset from each other obtained by relatively shifting optical axes of the lens portions, and (c) the reflection surfaces correspond to the respective combined lenses.

First, since the screen described above has reflection surfaces provided on the backside of the lens array, the reflection surfaces inclined to the plane in which the lens array is arranged, and scattering portions provided to scatter the light directed from the reflection surfaces, projection light incident on the screen can be appropriately scattered and reflected. Since the combined lens has two lens portions with their optical axes relatively shifted from each other, the screen sheet can maintain a sufficient strength with each of the reflection surfaces positioned close to the lens surface of the combined lens. Further, adjusting the amounts of shift of the optical axes of the two lens portions as appropriate allows the incident projection light to be scattered and reflected in an appropriate direction at an appropriate angle of view. At the same time, the influence of external light can also be reduced to improve the contrast of a projected image in a bright room or any other similar place.

As a specific aspect of the invention, the lens array includes a plurality of cylindrical lenses as the plurality of element lenses, and the lens array is comprised of a lenticular lens in which the plurality of cylindrical lenses are arranged in the direction perpendicular to the generating line of the cylindrical lenses in the side of the screen. In this case, using a lenticular lens as the lens array allows the screen to be readily fabricated.

As a specific aspect of the invention, the optical axis of the lens portion of the two lens portions that is located on one side in which the angle of incidence of projection light with respect to the two-dimensional plane is larger is located closer to the one side than the optical axis of the lens portion located on the other side, which is the opposite side to the one side. In this case, even when the reflection surface inclined to the corresponding lens surface is positioned close to the lens surface, the screen can reduces the tendency of the portion where the lens surface and the reflection surface is close to each other being thin and hence broken, and maintain a sufficient strength.

As a specific aspect of the invention, the optical axes of the two lens portions are shifted in opposite directions from the center of the combined lens. In this case, the optical path can be adjusted in accordance with the characteristics of the light that is incident on the combined lens and exits therefrom.

As a specific aspect of the invention, the optical axes of the two lens portions are equally spaced apart from the center of the combined lens. In this case, the combined lens is relatively readily fabricated.

As a specific aspect of the invention, the relative amount of shift of the optical axis of each of the two lens portions is within a range from $1/12$ to $1/3$ a single pitch that corresponds to a single combined lens in the lens array. In this case, such a shift allows the incident light to be scattered and reflected in an appropriate direction at an appropriate angle of view without degrading a projected image.

As a specific aspect of the invention, the center of the reflection surface corresponding to the combined lens is located, with reference to the center of the combined lens, on one side in which the angle of incidence of projection light with respect to the two-dimensional plane is larger. In this case, the reflection surface is located in the combined lens on the side in which the angle of incidence of projection light with respect to the two-dimensional plane is larger, whereby diagonally incident projection light can be scattered and reflected more efficiently.

As a specific aspect of the invention, the side cross-sectional shape of at least one of the two lens portions includes a non-arcuate shape whose curvature becomes smaller in portions closer to the periphery close to an adjacent lens. In this case, the portion where each of the reflection surfaces is close to the surface of the lens array is thick, whereby the screen can be more robust.

As a specific aspect of the invention, the screen sheet includes a first area in which in the lens array, projection light exits from an element lens different from the element lens on which the projection light is incident and a second area in which in the lens array, projection light exits from the same element lens as the element lens on which the projection light is incident, and the lens array includes the combined lens in the second area. In this case, since the type of reflection in the first area differs from that in the second area, the projection light can be effectively scattered and reflected without light loss in accordance with the angle of incidence of the projection light incident on the two areas. In particular, since the lens array in the second area includes a lens whose curvature changes, the screen sheet can have a sufficient strength while the lens surface of the curvature changing lens is positioned close to the corresponding reflection surface.

As a specific aspect of the invention, the screen further includes a light-absorbing plane made of a light-absorbing material at least on the portions of the backside of the lens array that are located around the reflection surfaces. In this case, the light-absorbing plane absorbs external light and other unwanted light, whereby a high-contrast image can be formed.

As a specific aspect of the invention, the lens array has an anti-reflection coating thereon. It is thus possible to prevent reflection on the surface of the screen.

As a specific aspect of the invention, the lenticular lens can be rolled and has a structure in which the longitudinal direction of the plurality of cylindrical lenses is oriented along the direction of the axis around which the lenticular lens is rolled. In this case, since boundaries between the plurality of cylindrical lenses are primarily bent when the screen is rolled and stored, the amount of deformation of the body of each of the cylindrical lenses can be reduced.

As a specific aspect of the invention, a projection system according to another aspect of the invention includes (a) any of the screens described above and (b) an image projection apparatus that projects a projected image on the screen. In this case, using any of the screens described above in the projection system allows projection light to be appropriately scattered and reflected for efficient use of the light, and the influence of external light to be reduced to improve the contrast of a projected image in a bright room or any other similar place.

BRIEF DESCRIPTION OF THE DRAWINGS

The invention will now be described with reference to the accompanying drawings, wherein like numbers reference like elements.

DESCRIPTION OF EXEMPLARY EMBODIMENTS

First Embodiment

Figure 1:
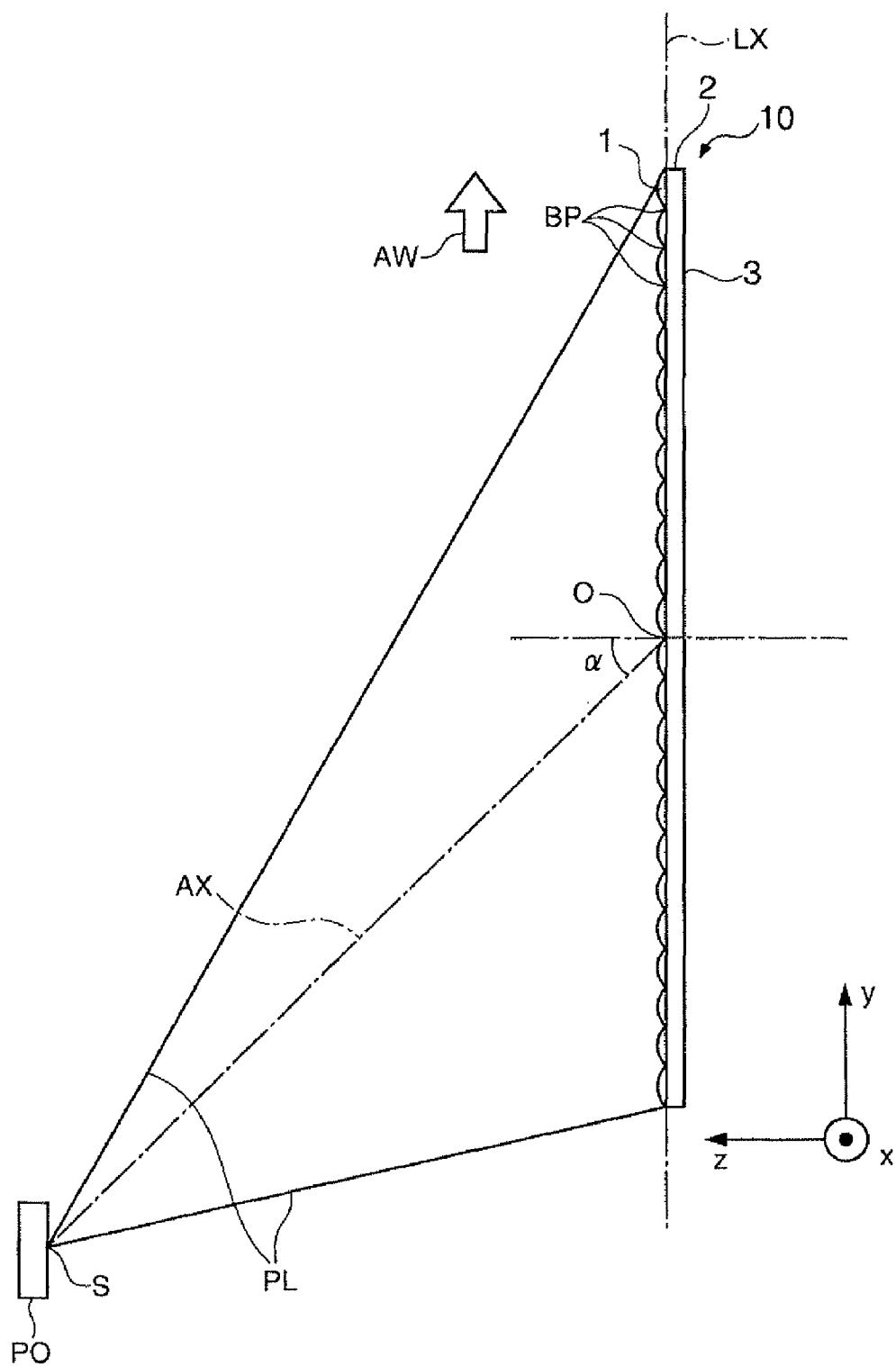
FIG. 1 is a side view diagrammatically showing a screen according to a first embodiment.

A screen according to a first embodiment of the invention will be described below with reference to the drawings. FIG. 1 is a side view diagrammatically showing the screen according to the present embodiment. The screen 10 according to the present embodiment is a reflective screen, and includes a light-transmissive screen sheet 2 having a lens array provided thereon and a light-absorbing sheet 3 attached to the entire backside of the screen sheet 2.

As shown in FIG. 1, an image is projected when a projection light source point S on a projection lens PO provided in a projection apparatus or any other similar apparatus projects projection light PL on the screen 10. The projection light source point S is disposed in a lower position close to the screen 10. In the embodiment, a light flux axis AX of the projection light PL extends from below to above and intersects the screen 10 at an angle of incidence α at the center O positioned at the middle of a screen central axis LX extending in the up-down direction at the middle of the right-left direction of the screen 10.

Figure 2:
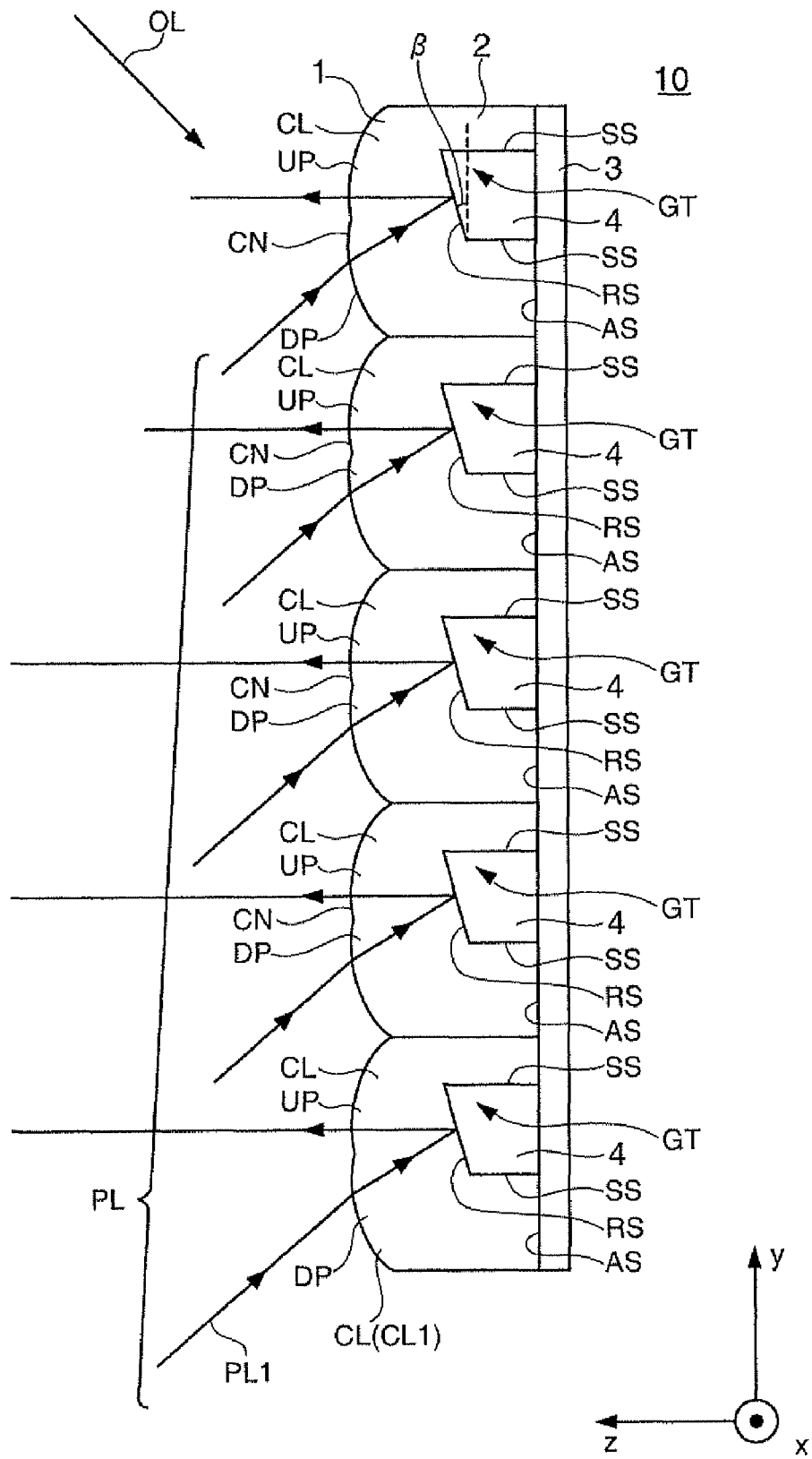
FIG. 2 is a side cross-sectional view explaining the structure of the screen.

FIG. 2 is a side cross-sectional view diagrammatically showing the structure of the screen 10. The screen sheet 2 includes a lenticular lens 1 that is a lens array having cylindrical lenses CL two-dimensionally arranged on the front side of the screen sheet 2, and grooves GT periodically provided on the back side of the lenticular lens 1 so that the grooves GT correspond to the cylindrical lenses CL. Scattering portions 4 are formed in the screen sheet 2 by applying a scattering material into the grooves GT, and the light-absorbing sheet 3 is attached to the backside of the screen sheet 2 to cover the scattering portions 4 after the scattering portions 4 have been formed.

The lenticular lens 1 formed on the front side of the screen sheet 2 has a large number of cylindrical lenses CL as element lenses, each of which having a substantially semi-cylindrical outer shape and extending in the x axis direction (i.e., perpendicular to the sheet). As the element lenses are arranged in the y axis direction and forming a surface generally extending parallel to the xy plane. That is, the cylindrical lenses CL are disposed in a two-dimensional plane to form the entire surface of the screen 10 (see FIG. 1). Each of the cylindrical lenses CL receives and focuses the projection light PL coming through the projection lens PO shown in FIG. 1 and oriented diagonally upward, and outputs the projection light PL divergent at a predetermined angle in the forward (z axis) direction after reflected off reflection surfaces RS, which will be described later, and scattered by the scattering portions 4 in the screen 10. The cylindrical lens CL is a combined lens comprised of a set of two upper and lower (toward y axis direction) lens portions UP and DP. The two lens portions UP and DP, which will be described later in detail, extending in the x axis direction are off-centered by relatively shifting the optical axes thereof in the y axis direction, which is the up-down direction. The cylindrical lens CL is configured as a single integrated lens comprised of the two lens portions UP and DP. The y-z cross section of the cylindrical lens CL is therefore not accurately semicircular, but has a shape formed by connecting the arcuate contours of the cross sections of the two lens portions UP and DP and having an indented inflection at the center in the y axis direction.

On the other hand, the grooves GT are formed in the backside of the screen sheet 2 along the longitudinal direction of the cylindrical lenses CL, that is, the x axis direction in such a way that the grooves GT correspond to the cylindrical lenses CL. On the upper and lower sides of each of the grooves GT are formed side surfaces SS substantially perpendicular to the y axis direction, which is the up-down direction, along which the cylindrical lenses CL are arranged. The groove GT is defined by the side surfaces SS and an inclined reflection surface RS, and has a trapezoidal yz cross section. The reflection surface RS is inclined by a predetermined inclination angle β in order to more efficiently reflect the projection light PL in the forward direction, that is, the +z axis direction (to the viewing side) when the projection light PL focused by the corresponding cylindrical lens CL and oriented diagonally upward is incident on the reflection surface RS. Each of the scattering portions 4 fills the corresponding groove ST shaped as described above, and has a reversed shape of the groove GT. The scattering portion 4, when reflecting the light incident through the reflection surface RS in the +z axis direction, converts the light into scattered light with appropriate dispersion characteristics. It is thus possible to increase the effect of guiding the projection light PL, incident from a close-range lower position onto the screen 10, in the forward direction and converting the projection light PL into uniformly divergent light. An example of the scattering component is, for example, barium sulfate ($BaSO_4$) or barium sulfate mixed with a white reflective ink (a white pearl ink, for example).

The light-absorbing sheet 3 made of a light-absorbing material is formed to cover the entire backside of the screen sheet 2. The light-absorbing sheet 3 forms a light-absorbing surface AS that absorbs external light and other unwanted light in such a way that the light-absorbing surface AS surrounds each of the scattering portions 4. The thickness of the entire screen 10 preferably ranges from approximately 0.3 to 0.5 mm.

The operation of the screen 10 will be described below by describing the optical path of the projection light PL with reference to FIG. 2.

As shown in FIG. 2, projection light PL1 incident on, among the cylindrical lenses CL, for example, a cylindrical lens CL1 located in the lowermost position in the y axis direction in FIG. 2 is focused and then scattered and reflected off the reflection surface RS and other surfaces positioned behind the cylindrical lens CL1. The projection light PL1 is primarily incident on the lens portion DP positioned on the lower side of the cylindrical lens CL1 in the y axis direction. The appropriately divergent projection light PL1 reflected off the reflection surface RS passes through the cylindrical lens CL1 and exits therefrom in the forward direction. The projection light PL1 from the reflection surface RS primarily exits from the lens portion UP positioned on the upper side of the cylindrical lens CL1 in the y axis direction. The projection light PL1 incident through the upper lens portion UP is also scattered and reflected off the reflection surface RS and then exits from the lens portion UP. As described above, the projection light PL1 incident on the cylindrical lens CL1 exits from the same cylindrical lens CL1. Similarly, the projection light PL incident on each of the cylindrical lenses CL positioned above the cylindrical lens CL1 exits from the same cylindrical lens CL.

As shown in FIG. 2, when the projection light PL is scattered and reflected in a single cylindrical lens CL, to reduce light loss, the reflection surface RS is desirably positioned in more upper portion in a single unit, that is, a single pitch of the cylindrical lens CL, and there is a tendency to position the upper corner of the reflection surface RS closer to the lens surface of the cylindrical lens CL. When the upper corner of the reflection surface RS is too close to the cylindrical lens CL having a typical shape, that is, a circular cross section, there is a tendency of the angle of view for the projection light PL on the upper side to be reduced to an insufficient level and a tendency of the screen sheet 2 to be likely broken due to the thin portion. To address the problems, the cylindrical lens CL is configured to have a cross-sectional shape comprised of two arcs.

Figure 3A:
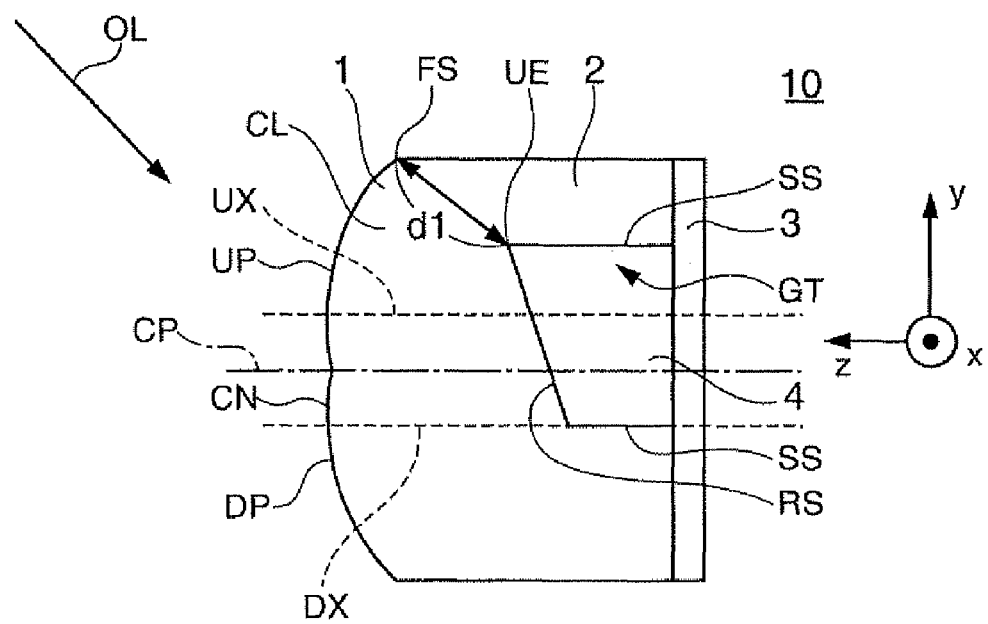
FIGS. 3A and 3B explain the shape and structure of the screen.
Figure 3B:
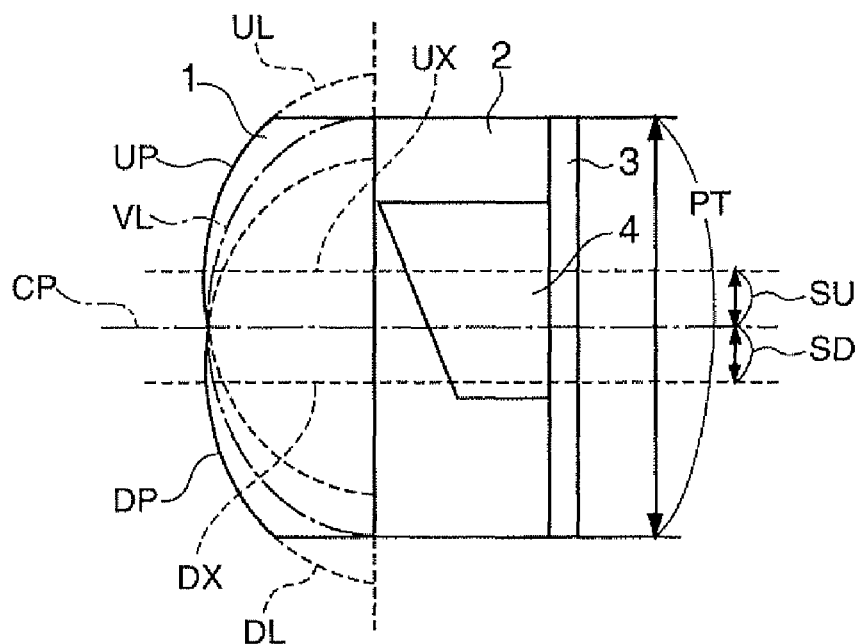

FIGS. 3A and 3B are side cross-sectional views showing a single cylindrical lens CL of the lenticular lens 1, that is, the portion of the screen 10 that corresponds to a single pitch in order to explain the shape of the surface of the cylindrical lens CL. FIG. 3B explains the shape of the surface of the cylindrical lens CL.

In the screen 10 of the present embodiment, the contour CU of the side cross section of the cylindrical lens CL is formed of a single curve obtained by combining two arcs that are cross-sectional contours of the two lens portions UP and DP. That is, the cylindrical lens CL is comprised of a single combined lens formed of a set of the lens portions UP and DP, which respectively occupy the upper and lower portions divided by a central axis CP positioned at the center in the up-down direction in a single pitch in FIGS. 3A and 3B. The lens portion UP is shifted upward in the y axis direction from the central axis CP, whereas the lens portion DP is shifted downward in the y axis direction from the central axis CP. As a result, the optical axes UX and DX of the lens portions UP and DP are relatively shifted upward and downward and spaced apart from each other. That is, in this case, considering the two lens portions UP and DP, the optical axis UX of the lens portion UP, on which the projection light PL is incident at a larger angle than in the lens portion DP, that is, which is positioned on the upper side in the y axis direction, is above in the y axis direction the optical axis DX of the lens portion DP positioned on the opposite side.

The shape of the cylindrical lens CL will be described below more specifically with reference to FIG. 3B. First, an virtual lens VL having a semicircular cross section indicated by the dashed line in FIG. 3B is defined as a reference for forming the two lens portions UP and DP. The optical axis of the virtual lens VL coincides with the central axis CP positioned at the center in the y axis direction in a single pitch. That is, the virtual lens VL has a semicircular cross section symmetric with respect to the central axis CP. The upper lens portion UP corresponds to the shape obtained by shifting the virtual lens VL upward, that is, in the +y axis direction. More specifically, in an virtual lens UL (the dotted line and the solid line in FIG. 3B) having its optical axis UX above the central axis CP obtained by shifting the virtual lens VL upward, the portion above the central axis CP in a single pitch is the cross section of the upper lens portion UP, as indicated by the solid line in FIG. 3B. Similarly, the lower lens portion DP corresponds to the shape obtained by shifting the virtual lens VL downward, that is, in the −y axis direction. More specifically, in an virtual lens DL (the dotted line and the solid line in FIG. 3B) having its optical axis DX below the central axis CP obtained by shifting the virtual lens VL downward, the portion below the central axis CP in a single pitch is the cross section of the lower lens portion DP, as indicated by the solid line in FIG. 3B. As described above, the shape of the combined lens formed of a set of the two upper and lower lens portions UP and DP offset from each other can be obtained by shifting them upward and downward, respectively, in the y axis direction. Such a combined lens forms the cylindrical lens CL. In this case, adjusting the amount of offset, that is, the amount of shift as appropriate, allows the screen sheet 2 to be unlikely broken and the screen 10 to have a sufficient strength with the distance d1, which is measured from the upper end UE of the reflection surface RS to a lens surface FS of the cylindrical lens CL that is closest to the upper end UE, to be a fixed value or greater. Further, such a configuration allows the incident projection light PL to be scattered and reflected in an appropriated direction at an appropriate angle of view.

The distance SU from the central axis CP to the optical axis UX corresponds to the amount of shift of the lens portion UP, and the distance SD from the central axis CP to the optical axis DX corresponds to the amount of shift of the lens portion DP. Each of the distances SU and SD indicative of the amounts of shift is preferably set to a value $1/12$ to $1/6$ times the length PT that corresponds to a single pitch of the cylindrical lens CL in the screen 10. For example, when an image is projected by a projector and the size of the projected image on the screen 10 ranges from approximately 80 to 100 inches, the size of a single pixel of the projected image is approximately 1 mm. To prevent a moire pattern and other disadvantageous phenomena from being generated, the length PT that corresponds to a single pitch of the cylindrical lens CL is therefore desirably approximately one-third a single pixel, and hence the length PT is, for example, set to approximately 0.3 mm. Further, to prevent the shift of the lens portions UP and DP from affecting the projection light PL and degrading a projected image, the amount of shift of each of the lens portions UP and DP is set to a value $1/12$ to $1/6$ times the length PT that corresponds to a single pitch. In FIG. 3B, the distances SU and SD are equal to each other and approximately $1/8$ the length PT that corresponds to a single pitch. When the amounts of shift of the lens portions UP and DP from the central axis CP are equal to each other, the cylindrical lens CL is symmetric with reference to the central axis CP, whereby the lens surface of the cylindrical lens CL is relatively readily manufactured.

In the cylindrical lens CL described with reference to FIGS. 3A and 3B, the two lens portions UP and DP are defined as those shifted from the reference central axis CP. The lens portions UP and DP may be differently configured as long as they are relatively shifted. The configuration of the cylindrical lens CL is therefore not limited to that shown in FIG. 3A and other figures. For example, only the upper lens portion UP of the two lens portions UP and DP may be shifted, whereas the lower lens portion DP may not be shifted so that the optical axis DX of the lens portion DP coincides with the central axis CP. As described above, when the amount of shift of each of the optical axes DX and UX is set to a value $1/12$ to $1/6$ times the length PT that corresponds to a single pitch, and at least one of the lens portions UP and DP is shifted, the relative amount of shift between the optical axes DX and UX ranges from $1/12$ times the length PT that corresponds to a single interval to $1/3$ times the length PT.

Illumination lights or other types of light that produces external light OL, which is unwanted light in image projection, are often installed, for example, on the ceiling of a room and illuminate the room. The external light OL thus projected from above is incident on the screen 10, particularly on the upper side surface SS of the upper and lower side surfaces SS of each of the grooves GT or the light-absorbing surface AS of the light-absorbing sheet 3. The external light OL incident on the upper side surfaces SS of the grooves ST is not directed from the upper side surface SS toward an area in front of the screen 10 where a viewer is located, but reflected, for example. The external light OL incident on the light-absorbing sheet 3 is also not directed toward an area in front of the screen 10 but absorbed.

Referring back to FIGS. 1 and 2, an AR coating CT, which is an anti-reflection coating, is formed on the surface of each of the cylindrical lenses CL that form the surface of the lenticular lens 1. The AR coating CT prevents reflection of light.

The screen 10 can be rolled in the direction indicated by the arrow AW shown in FIG. 1. In this case, the fact that boundaries BP that connect cylindrical lenses CL of the lenticular lens 1 are primarily bent allows the screen 10 to be rolled and stored without the cylindrical lenses CL themselves greatly deformed.

Figure 4C:
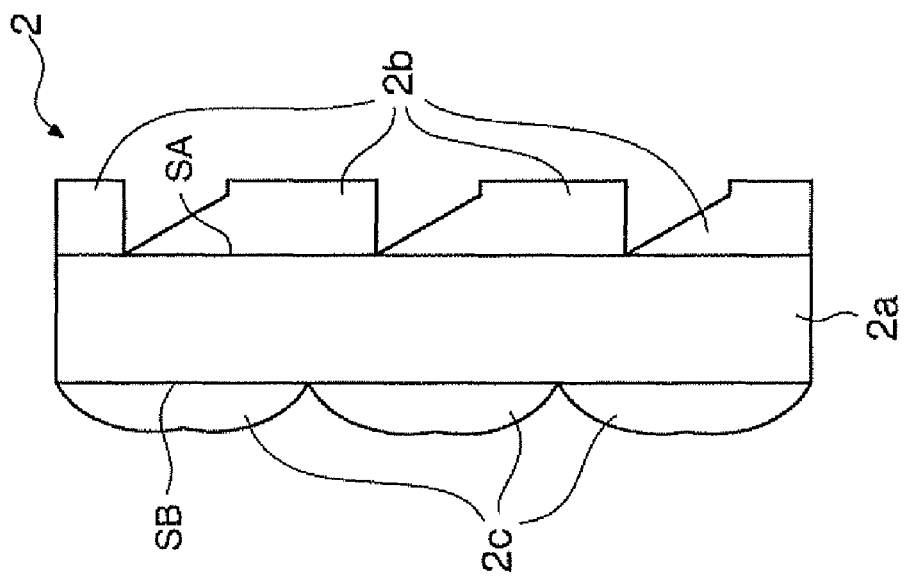
FIGS. 4A, 4B, and 4C explain a method for manufacturing a screen sheet.
Figure 4B:
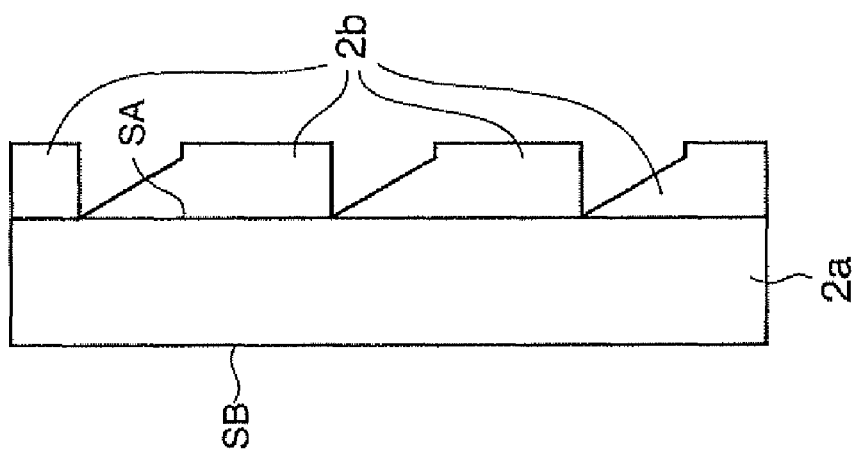
Figure 4A:
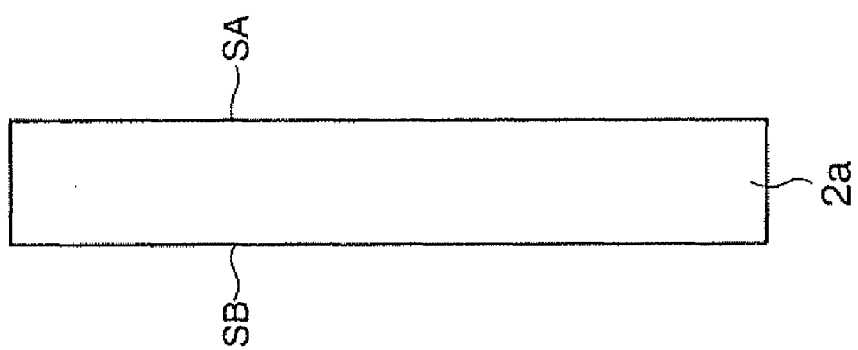

A description will be made of an example of a method for manufacturing the screen 10 according to the present embodiment. FIGS. 4A, 4B, and 4C show an example of a method for manufacturing the screen sheet 2 of the screen 10. First, as shown in FIG. 4A, a box-shaped base film 2a made of a light-transmissive resin material is prepared. Formed portions 2b are then formed on one side SA of the base film 2a by using the same material as that of the base film 2a, the formed portions 2b being the grooves GT and other portions that form the backside of the screen sheet 2. Finally, formed portions 2c are formed on the other side SB, which is opposite the side SA, by using the same material as that of the base film 2a, the formed portions 2c being the lenticular lens 1 that forms the front side of the screen sheet 2. The screen sheet 2 can be formed by thus forming the above portions separately.

On the back side of the thus formed screen sheet 2, as shown in FIG. 2 and other figures, the scattering portions 4 are formed in the grooves GT. More specifically, the scattering portions 4 are formed by spraying an ink made of a material primarily containing a scattering component made of, for example, barium sulfate along the grooves CT positioned behind the cylindrical lenses CL and filling the grooves GT with the material to entirely cover the reflection surfaces RS. After the grooves GT are filled with the scattering portions 4, the entire backside of the screen sheet 2 is covered with a light-absorbing material to form the light-absorbing sheet 3. The AR (anti-reflection) coating CT is formed on the surface of each of the cylindrical lenses CL. The screen 10 is thus fabricated.

Figure 5A:
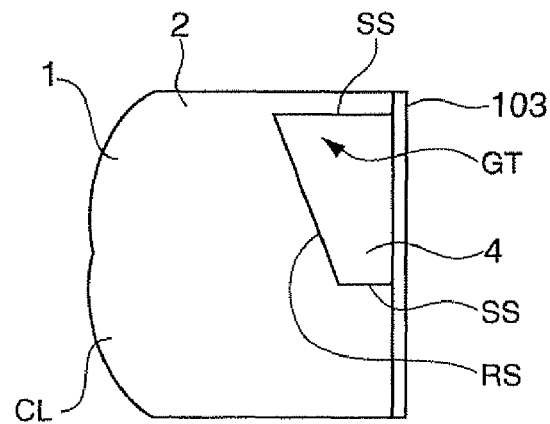
FIGS. 5A, 5B, and 5C explain other methods for manufacturing the screen.
Figure 5B:
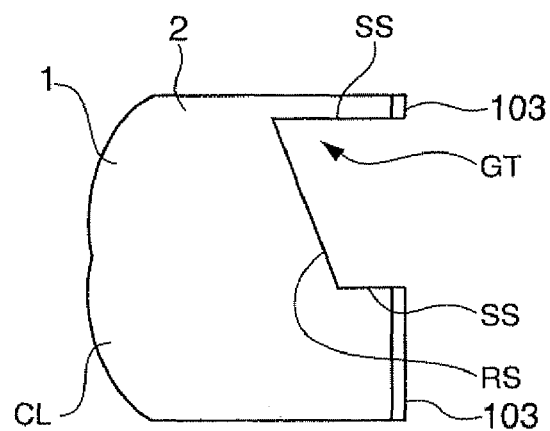
Figure 5C:
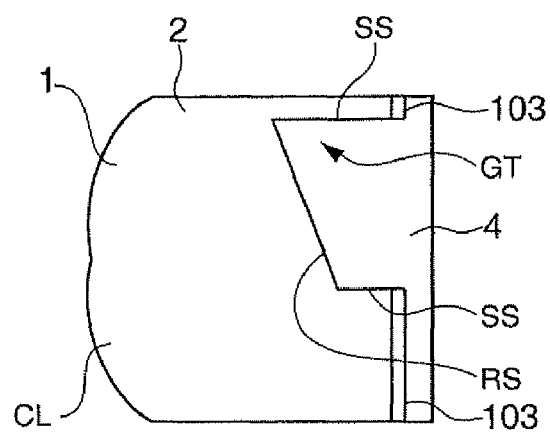

FIGS. 5A, 5B, and 5C explain variations of the method for manufacturing the screen of the present embodiment. FIGS. 5A, 5B, and 5C are side cross-sectional views diagrammatically showing a single cylindrical lens CL, that is, the portion of the screen 10 that corresponds to a single pitch. The method for manufacturing the screen sheet 2 is the same as that described in the above embodiment, and no description thereof will be made. Among FIGS. 5A, 5B, and 5C, in the example as a first variation shown in FIG. 5A, a light-absorbing layer 103 is formed instead of the light-absorbing sheet 3 shown in FIG. 2. That is, after the scattering portions 4 are formed, the light-absorbing layer 103 is formed, for example, by applying a light-absorbing ink to cover the entire backside of the screen sheet 2. FIGS. 5B and 5C show still another manufacturing method step by step. In the present variation, as shown in FIG. 5B, a light-absorbing ink is first applied on the backside of the screen sheet 2 before the scattering portions 4 are applied, so that a light-absorbing layer 103 having openings at the positions of the grooves GT is formed. Thereafter, as shown in FIG. 5C, a scattering material is applied to the entire backside of the screen sheet 2 to fill the grooves GT, so that the scattering portions 4 are formed. The manufacturing methods described above are illustrated by way of example, and any other manufacturing method can be employed as long as it provides a similar structure.

Each of the scattering portions 4 may be differently configured as long as the reflection surface RS provides a scattering effect, and the scattering material is not necessarily filled over the groove GT. Therefore, for example, the scattering portion 4 may be formed by applying a scattering material only to the reflection surface RS of the groove GT. Instead of using a scattering material, a scattering effect may be provided, for example, by forming irregularities on the reflection surface RS.

Figure 6:
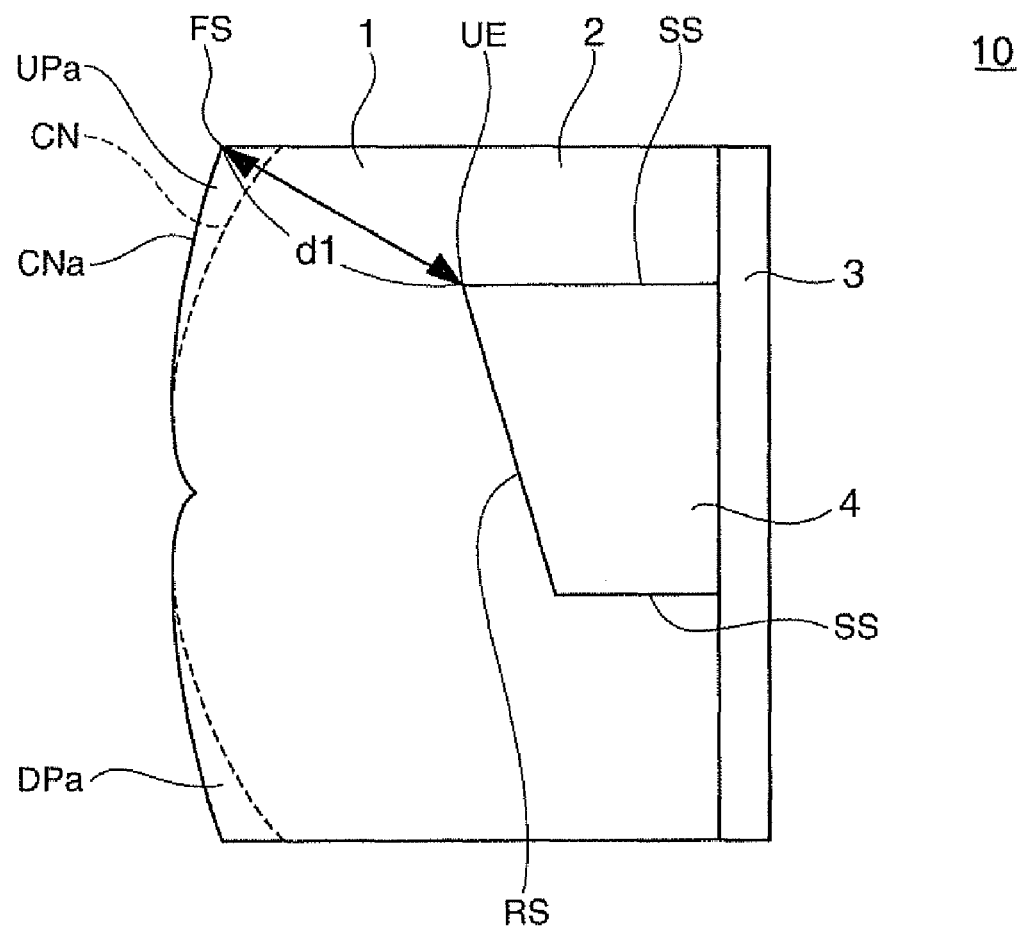
FIG. 6 is a side view showing a variation of the screen according to the first embodiment.

FIG. 6 explains a variation of the screen 10 shown in FIG. 2 and other figures. FIG. 6 shows the portion of the screen 10 of the variation that corresponds to a single pitch. In FIG. 6, the contour CN indicated by the broken line is the contour CN shown in FIG. 3A. As seen from comparison between the contour CNa of the cross section of lens portions UPa and DPa and the contour CN indicated by the broken line in FIG. 6, the contour CNa is a non-arcuate curve that becomes less steeper than the original arc in a portion closer to the periphery, that is, in a portion closer to an adjacent cylindrical lens CL (not shown). That is, the curvature is smaller in a portion closer to the periphery. In this case, increasing the distance d1 to the surface FS that is close to the upper end UE, which tends to create the thinnest portion in the screen sheet 2, allows the thinnest portion to be thicker. Further, reducing the curvature of the cylindrical lens CL at the periphery allows the amount of the projection light PL that is totally reflected off the lens surface of the cylindrical lens CL to be reduced when the projection light PL exits from the cylindrical lens CL, whereby the light can be efficiently used. The above description is presented only by way of example, and the curvature may be changed only for the lens portion UPa of the two lens portions UPa and DPa. In this case as well, the distance d1 can be increased.

As described above, in the screen 10 according to the present embodiment, making the shape and other characteristics of the reflection surface RS suitable to scatter and reflect the incident projection light PL allows the projection light PL from below to be scattered and reflected toward the viewer at an appropriate angle of view. Further, the screen 10 can have a sufficient strength while maintaining a thin structure by using two lens portions UP and DP or UPa and DPa with their optical axes relatively shifted in the y axis direction to form the shape of the surface of the cylindrical lens CL as a single lens. Further, the side surfaces SS, and the light-absorbing sheet 3 or 103 are used to prevent the external light OL from above from being reflected toward the viewer, whereby a high-contrast image can be formed even in a bright room or any other similar place.

Second Embodiment

Figure 7:
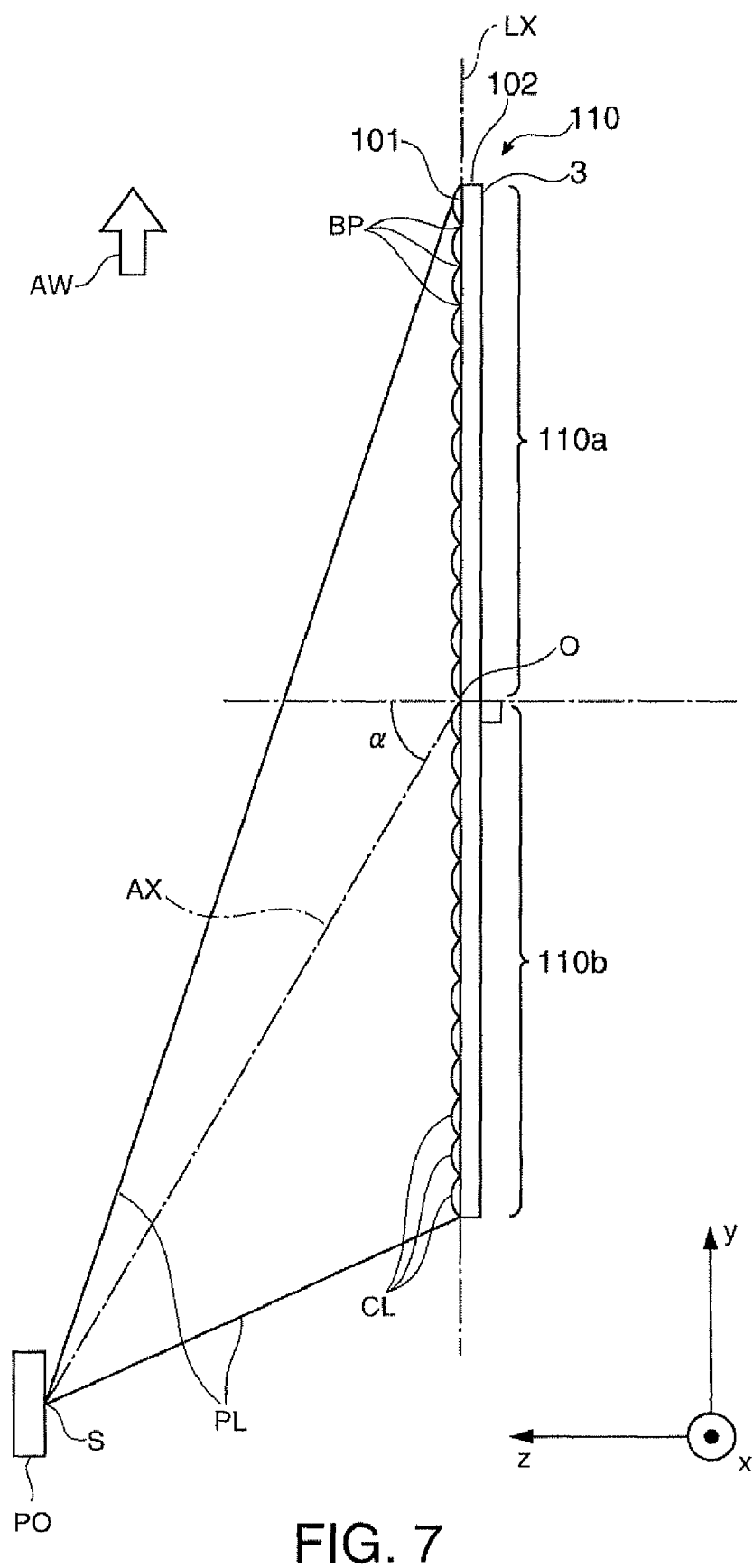
FIG. 7 is a side view diagrammatically showing a screen according to a second embodiment.

FIG. 7 is a side view diagrammatically showing a screen according to a second embodiment. A screen 110 of the present embodiment is a reflective screen as in the screen 10 of the first embodiment shown in FIG. 1, and includes a light-transmissive screen sheet 102 having a lens array provided thereon and a light-absorbing sheet 103 attached to the entire backside of the screen sheet 102.

In FIG. 7, as in FIG. 1, a projection light source point S on a projection lens PO disposed in a lower position close to the screen 110 projects projection light PL on the screen 110. In this case, however, the angle of incidence of the projection light PL is, in particular, significantly larger than that in FIG. 1. Specifically, the angle of incidence α of the light flux axis AX of the projection light PL is set to 60 degrees. In such a case, there are significantly large differences in the angle of incidence of the projection light PL depending on the place where the projection light PL is incidents that is, there are places where the angle of incidence is significantly large and places where the angle of incidence is relatively small. It is therefore desirable to change the type of reflection in accordance with the position where the projection light PL is incident. Using the angle of incidence of 60 degrees as a reference, the screen 110 is therefore divided into a first area 110a on the upper side of the screen and a second area 110b on the lower side of the screen. The first area 110a differs from the second area 110b in terms of shape or location.

In the first area 110a and the second area 110b, the structure of the screen 110 in the second area 110b where the angle of incidence is relatively small is the same as that in the first embodiment shown in FIG. 2 and other figures. That is, the projection light PL is scattered and reflected in a single cylindrical lens CL. On the other hand, the structure of the screen 110 in the first area 110a differs from that of the second area 110b so that they provide different reflection modes.

Figure 8:
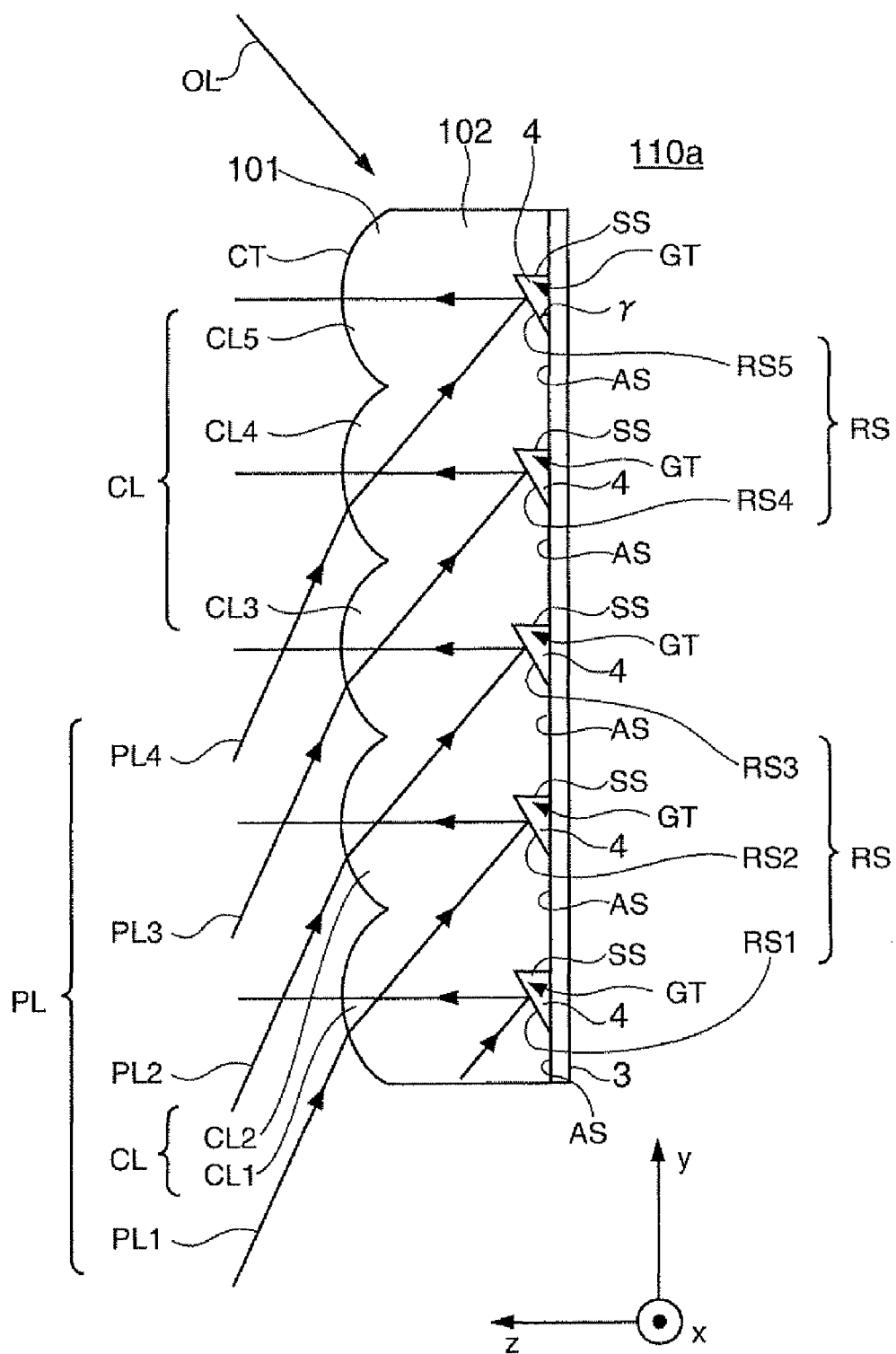
FIG. 8 is aside cross-sectional view explaining part of the screen according to the second embodiment.

FIG. 8 is a side cross-sectional view diagrammatically showing an example of the structure of the screen 110 in the upper first area 110a. In the first area 110a, the shape of the groove GT differs from the shape of the groove GT in the second area 110b having the structure shown in FIG. 2, and is defined by a side surface SS substantially perpendicular to the y axis direction along which cylindrical lenses CL are arranged and an inclined reflection surface RS, forming a triangle yz cross-section. That is, as seen from comparison between FIG. 8 and FIG. 2, the shape of the groove GT in the area 110a differs from that in the area 110b in terms of the depth of the reflection surface RS, and the reflection surface RS in the first area 110a is inclined by a predetermined inclination angle γ different from the inclination angle β in the second area 110b in accordance with the difference in the angle of incidence of the projection light PL in order to more efficiently reflect the projection light PL in the forward direction, that is, the +z direction. It is noted that each cylindrical lens CL has a semicircular cross-sectional shape.

The operation of the screen 110 will be described below by describing the optical path of the projection light PL in the first area 110a with reference to FIG. 8.

As shown in FIG. 8, projection light PL1 incident on, among the cylindrical lenses CL that form a lenticular lens 101, a cylindrical lens CL1 located in the lowermost position in the y axis direction in FIG. 8 exits from a cylindrical lens CL2 located immediately above the cylindrical lens CL1. That is, the projection light PL1 is scattered and reflected off a reflection surface RS2 positioned behind the cylindrical lens CL2, which is immediately above the cylindrical lens CL1 on which the projection light PL1 is incident, and exits from the cylindrical lens CL2. Similarly, projection light PL2 incident on the cylindrical lens CL2 exits from a cylindrical lens CL3 via a reflection surface RS3. Projection light PL3 incident on the cylindrical lens CL3 exits from a cylindrical lens CL4 via a reflection surface RS4. Projection light PL4 incident on the cylindrical lens CL4 exits from a cylindrical lens CL5 via a reflection surface RS5. That is, in the first area 110a, projection light PL incident on a cylindrical lens CL exits from the cylindrical lens CL adjacent to the cylindrical lens CL.

As described above, the screen 110 of the present embodiment is divided into the first area 110a and the second area 110b in accordance with the angle of incidence of the projection light PL, and the type of reflection is different in the two areas. At the same time, the second area 110b, which is part of the screen 10, has non-arcuate cylindrical lenses CL, each of which having a curvature smaller than that of an arcuate cylindrical lens. Employing such a configuration allows the projection light incident on the areas 110a and 110b to be effectively scattered and reflected without light loss in accordance with the incident projection light. In the second area 110*b*, in particular, the screen sheet 102 can have a sufficient strength while the reflection surfaces PS are positioned close to the lens surfaces of the cylindrical lenses CL.

In the first area 110*a* shown in FIG. 8, each of the cylindrical lenses CL of the lenticular lens 101 may also have the cross-sectional shape shown in FIG. 2 and other figures. In this case, for example, adjusting the amount of shift of the lower lens portion DP as appropriate to adjust the optical path of the incident projection light PL allows the screen sheet 102 in the first area 110*a*, which tends to be thick, to be kept thin.

In the second embodiment described above, the screen 110 is divided into upper and lower two portions with reference to the angle of incidence α of 60 degrees so that the projection light PL is reflected and scattered in two different patterns. The screen 110 is, however, not necessarily divided into the upper and lower two portions, but a variety of dividing methods can be used with reference to the angle of incidence α of 60 degrees. For example, a transition area may be provided between the first area 110*a* and the second area 110*b* in the vicinity of the point where the angle of incidence α is 60 degrees, and the transition area may be configured in such a way that the two different patterns in the first area 110*a* and the second area 110*b* are mixed to allow one of the patterns gradually changing to the other pattern. Further, for example, the number of areas in the screen is not necessarily two for two patterns, but may be three or more.

In the second embodiment described above, in the first area 110*a*, while the projection light PL exits from the cylindrical lens CL adjacent to the cylindrical lens CL on which the projection light PL is incident, other reflection modes may be employed. For example, the projection light PL may exit from every other cylindrical lens CL, that is, the projection light PL exits from the cylindrical lens CL immediately above the cylindrical lens CL adjacent to the cylindrical lens CL on which the projection light PL is incident.

In the second embodiment described above, while the angle of incidence α is 60 degrees at the center O, the position where the angle of incidence α of the projection light PL is 60 degrees may be a position on the screen central axis LX but different from the center O. In this case, the position where the angle of incidence α is 60 degrees but which is different from the center O is the reference for dividing the screen into the first area 110*a* and the second area 110*b*. Alternatively, the angle of incidence used as the reference for dividing the screen into areas may differ from 60 degrees in accordance with, for example, the reflection pattern in the screen.

Third Embodiment

Figure 9:
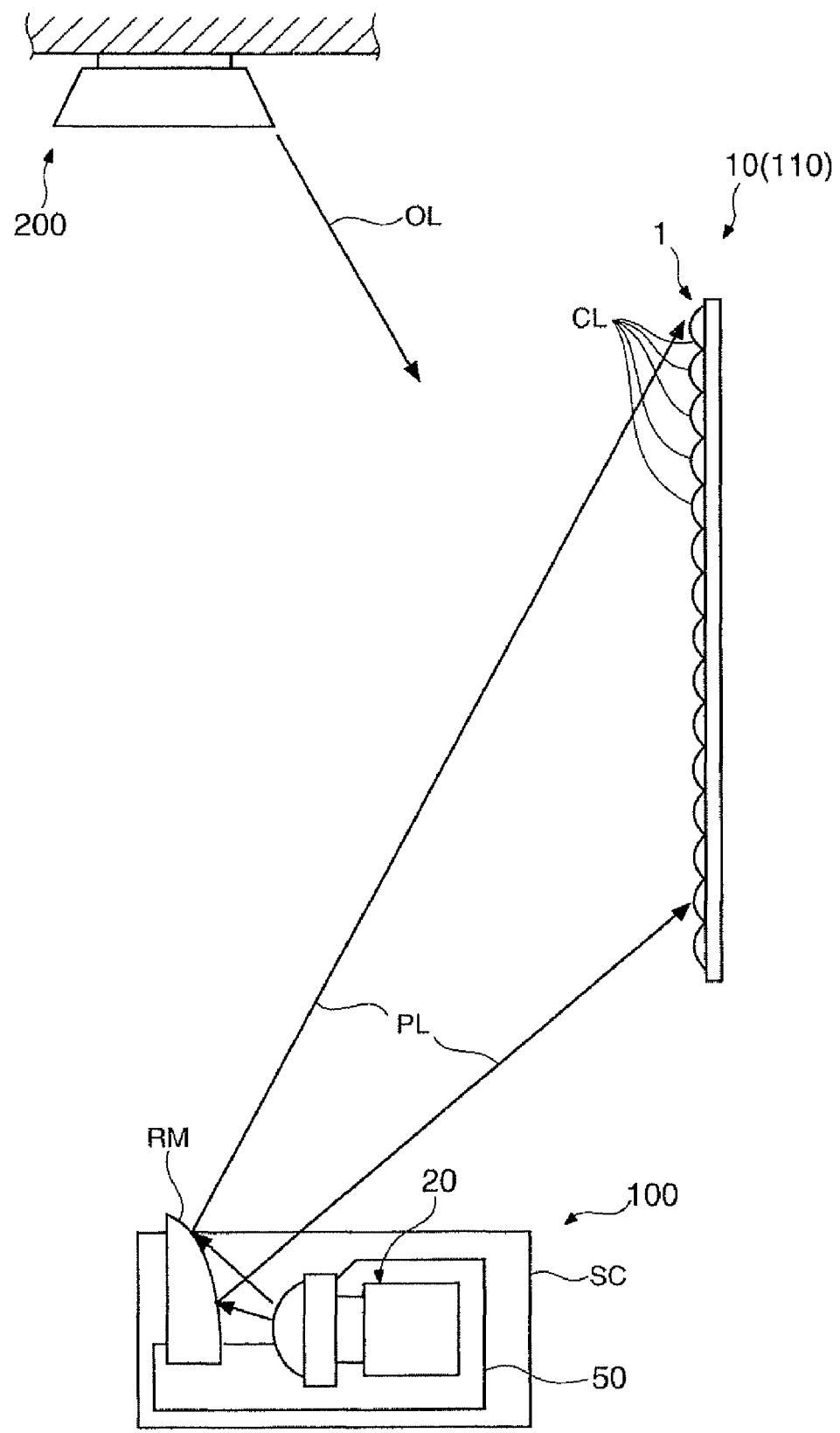
FIG. 9 diagrammatically shows a projection system according to a third embodiment.

FIG. 9 shows an example of a projection system according to a third embodiment, a projection system using the screen 10 of the first embodiment or the screen 110 of the second embodiment along with a projector as an image projection apparatus. In FIG. 9, a projector 100 includes a projector body 50, a projection lens 20, and a reflection mirror RM. Each of the mechanisms of the projector 100 is housed in an enclosure SC. It is assumed in the present embodiment that as an environment in which the screen 10 or 110 and the projector 100 are installed, an illuminator 200 hung from the ceiling of a room illuminates the room with external light OL from above and the projector 100 projects light from below on the screen 10 or 110.

Image light formed under the control of the projector 50 is outputted through the projection lens 20, reflected off the reflection mirror RM, and outputted as projection light FL inclined by a desired angle from the projector 100. In this case, therefore, the projector 100 diagonally projects the projection light PL with the light flux axis thereof inclined to a normal to the screen 10 or 110. The projection light PL projected on the screen 10 or 110 is reflected off the screen 10 or 110 in the forward direction at an appropriate divergent angle, as described above. In this operation, as described above, since each of the screens 10 and 110 is configured in accordance with the angle of projection of the projection light PL, not only is an projected image less affected by the external light OL so that the contrast of the projected image can be improved in a bright room or any other similar place, but also the projection light PL can be appropriately outputted in the forward direction.

The invention is not limited the above embodiments, but can be implemented in a variety of aspects to the extent that they do not depart from the spirit of the invention. For example, the following variations are possible.

In the above embodiments, while the lens array is comprised of the lenticular lens 1, the lens array in each of the screens 10 and 110 may be differently configured. For example, microlenses may be arranged on a two-dimensional surface. In this case, the longitudinal cross section of the microlenses is shaped as shown in FIG. 2 and other figures.

In the above embodiments, while an ink containing a scattering component is applied to form the scattering portions 4, the scattering portions 4 may be alternatively formed, for example, by attaching a scattering sheet to each of the reflection surfaces RS.

While the light-absorbing layer 103 covers the entire backside of the lenticular lens 1, the light-absorbing layer 103 may be partially provided as required, for example, around each of the reflection surfaces RS on which the scattering portion 4 is applied, for example, in order to increase the contrast.

In the above embodiments, the pitch of the grooves GT is not specifically defined. The pitch of the grooves GT in the vertical direction of each of the screens 10 and 110 may be gradually changed in accordance with the angle of incidence of the projection light PL or other parameters.

In the above embodiments, while the inclination angle β of the reflection surface RS is fixed, the inclination angle may be different for each of the grooves GT in the screens 10 and 110.

In the above embodiments, the light flux axis AX of the projection light PL is oriented upward in consideration of an environment in which a typical projection apparatus is used, and the shape and other characteristics of the reflection surfaces RS in the lenticular lens 1 are configured accordingly. When the incident projection light PL is not oriented upward, the lenticular lens 1 may be differently configured accordingly. That is, for example, when the projector projects light sideways onto the screen, the configuration of the lenticular lens 1 and the inclination of the reflection surfaces RS may be changed in accordance with the direction in which the projection light PL is incident.

What is claimed is:

1. A screen comprising a screen sheet including
a lens array having a plurality of element lenses arranged in a two-dimensional plane on the front side of the screen,
a plurality of reflection surfaces disposed on the backside of the lens array, the plurality of reflection surfaces inclined to the two-dimensional plane, and
a plurality of scattering portions that scatter the light directed from the plurality of reflection surfaces toward the front side of the screen,
wherein at least one of the plurality of element lenses is a combined lens comprised of a set of two lens portions offset from each other obtained by relatively shifting optical axes of the lens portions, at least one of the plurality of scattering portions is provided within the combined lens, and the reflection surfaces correspond to the respective combined lenses.

2. The screen according to claim 1, wherein the lens array includes a plurality of cylindrical lenses as the plurality of element lenses, and the lens array is comprised of a lenticular lens in which the plurality of cylindrical lenses are arranged perpendicular to the generating line of the cylindrical lenses in the side of the screen.

3. The screen according to claim 2, wherein the lenticular lens can be rolled and has a structure in which the longitudinal direction of the plurality of cylindrical lenses is oriented along the direction of the axis around which the lenticular lens is rolled.

4. The screen according to claim 1, wherein the optical axis of the lens portion of the two lens portions that is located on one side in which the angle of incidence of projection light with respect to the two-dimensional plane is larger is located closer to the one side than the optical axis of the lens portion located on the other side, which is the opposite side to the one side.

5. The screen according to claim 1, wherein the optical axes of the two lens portions are shifted in opposite directions from the center of the combined lens.

6. The screen according to claim 5, wherein the optical axes of the two lens portions are equally spaced apart from the center of the combined lens.

7. The screen according to claim 1, wherein the relative amount of shift of the optical axis of each of the two lens portions is within a range from $\frac{1}{12}$ to $\frac{1}{3}$ a single pitch that corresponds to one of the combined lenses in the lens array.

8. The screen according to claim 1, wherein the center of the reflection surface corresponding to the combined lens is located, with reference to the center of the combined lens, on one side in which the angle of incidence of projection light with respect to the two-dimensional plane is larger.

9. The screen according to claim 1, wherein the side cross-sectional shape of at least one of the two lens portions includes a non-arcuate shape whose curvature becomes smaller in portions closer to the periphery close to an adjacent lens.

10. The screen according to claim 1, wherein the screen sheet includes a first area in which in the lens array, projection light exits from an element lens different from the element lens on which the projection light is incident and a second area in which in the lens array, projection light exits from the same element lens as the element lens on which the projection light is incident, and the lens array includes the combined lens in the second area.

11. The screen according to claim 1, further comprising a light-absorbing plane made of a light-absorbing material at least on the portions of the backside of the lens array that are located around the reflection surfaces.

12. The screen according to claim 1, wherein the lens array has an anti-reflection coating thereon.

13. A projection system comprising:

the screen according to claim 1; and an image projection apparatus that projects a projected image on the screen.

* * * * *